VICTOR C. ANDERSON,
INVENTOR.

HUEBNER, BEEHLER,
WORREL & HERZIG,
ATTORNEYS.

BY Albert M. Herzig

Oct. 17, 1961 V. C. ANDERSON 3,004,819

ELECTROSTATIC RECORDER

Filed April 9, 1956 6 Sheets-Sheet 2

VICTOR C. ANDERSON,
INVENTOR.

HUEBNER, BEEHLER,
WORREL & HERZIG,
ATTORNEYS.

BY Albert M. Herzig

Oct. 17, 1961 V. C. ANDERSON 3,004,819

ELECTROSTATIC RECORDER

Filed April 9, 1956 6 Sheets-Sheet 3

VICTOR C. ANDERSON,
INVENTOR.

BY HUEBNER, BEEHLER, WORREL & HERZIG,
ATTORNEYS.

Albert M. Herzig

Oct. 17, 1961 | V. C. ANDERSON | 3,004,819

ELECTROSTATIC RECORDER

Filed April 9, 1956 | 6 Sheets-Sheet 4

VICTOR C. ANDERSON,
INVENTOR.

HUEBNER, BEEHLER,
WORREL & HERZIG,
ATTORNEYS.

BY Albert M. Herzig

Oct. 17, 1961 V. C. ANDERSON 3,004,819

ELECTROSTATIC RECORDER

Filed April 9, 1956 6 Sheets-Sheet 5

VICTOR C. ANDERSON,
INVENTOR.

HUEBNER, BEEHLER,
WORREL & HERZIG,
ATTORNEYS.

BY Albert M. Herzig

Oct. 17, 1961 V. C. ANDERSON 3,004,819

ELECTROSTATIC RECORDER

Filed April 9, 1956 6 Sheets-Sheet 6

VICTOR C. ANDERSON,
INVENTOR.
HUEBNER, BEEHLER,
WORREL & HERZIG,
ATTORNEYS.
BY Albert M. Herzig 3,004,819
ELECTROSTATIC RECORDER Victor C. Anderson, San Diego, Calif., assignor to The Regents of The University of California, a corporation of California Filed Apr. 9, 1956, Ser. No. 576,874
5 Claims. (Cl. 346—74)

This invention relates to an apparatus for storing electrical signals as electrostatic charges on the surface of a moving dielectric medium for the purpose of being played back nondestructively by the use of a pickup probe in a recording-reproducing system.

No single recording-playback technique appears to be universally applicable to all recording problems; each has its own advantages as well as limitations. The technique to be described is most applicable where simplicity of construction and small size are important considerations, in particular for multiple channel recording systems, not requiring permanent storage.

An electrical signal can be stored as an electrostatic surface charge on a moving dielectric medium, and played back nondestructively by using a capacitative pickup probe. The characteristics of such a dielectric recorder depend on its three basic components; the dielectric medium, which stores the electrostatic charge, the recording head which produces the electrostatic charge, and the pickup probes which measure the magnitude of the electrostatic charge.

Several methods of recording an electrostatic charge on a dielectric surface have been considered. Among these are: a conducting wiper or roller, positive ion emission from a hot wire, ultra-violet ionization, ionization by radioactivity, and ionization by an electrical discharge. Of these, only the last two have been used in a practical application, although the use of both positive ion emission by a hot wire and radioactive ionization warrant further investigation.

When a conductor is placed on a dielectric surface, most of the area of the two surfaces is separated by a thin layer of air, and no electrostatic charge can be transferred until a potential exceeding the dielectric strength of this air gap is exceeded. This effect produces a very non-linear relationship between applied potential and the resultant surface charge, and hence a simple contactor or brush is not suitable for use as a dielectric recording head. The difficulty may be resolved if the air gap is broken down by the use of a secondary source of ionization which is independent of the signal to be recorded. In this way a charge of either polarity can be transferred to the surface by the drift of either positive or negative ions under the influence of the applied potential. If the ion density is great enough, the surface of the dielectric will be charged to a potential approaching that of the recording head as it enters the conducting region, and will retain this potential after leaving the head as a consequence of the residual charge on the surface. It can be seen that such an ionized region will serve as both an erasing and a recording head for a dielectric recorder.

The total conductivity of the ionized region of the recording head determines its erasing characteristics, i.e., its ability to remove a residual pattern of charge as the surface passes under it. On the other hand, it is the sharpness of the boundary of the conducting region which fixes a minimum wavelength in recording a surface charge and thereby sets the upper frequency limit for the recorder. The fluctuation of the average potential of the ionized region near the surface of the drum in general determines the noise level of the recorder, especially when an electrical discharge is used as a source of ionization.

It can be seen that in general, a high ion density for high conductivity, a rapid decay of ionization for a sharp boundary, and a highly stable source of ionization for a low noise level are to be desired. There are other secondary considerations such as mechanical stability, operating life, power consumption, size and cost.

Accordingly, it is an important object of my invention to provide an electrostatic recording apparatus for the purpose described above wherein the air gap between the recording head and the dielectric surface is ionized by a secondary source of ionization which is independent of the signal to be recorded.

Another object is to provide a compact electrostatic recorder of high mechanical stability, long operating life, low power consumption and cost, having good erasing characteristics, a sharp boundary conducting region and a low noise level.

A further object is to provide an efficient electrostatic recorder having an electrode for introduction of audio voltages on a dielectric medium separate from an ionization discharge means to minimize voltage fluctuation and background noise effects.

Additional objects will become apparent from the following description:

Stated in general terms, my invention comprehends an electrostatic recording apparatus for storing electrical signals an electrostatic charges on a dielectric medium for future playback purposes. The dielectric medium preferably is movably mounted with respect to a recording head. The recording head preferably includes a gas-ionizing electric discharge means, such as an arc or corona discharge means, for example, to ionize a conducting path through a gas, such as air, between the surface of the dielectric medium and the recording head. A suitable voltage source is connected to the discharge means to produce an ionizing discharge therein and an electrical signal source is provided to place electrostatic charges on the dielectric medium. The electrical signal source also may be connected to the discharge means, but preferably is connected separately to an electrode mounted in the ionized gas, conducting path adjacent the surface of the dielectric medium.

A more detailed description of specific embodiments of my invention is given with reference to the drawings, wherein.

Figure 1:
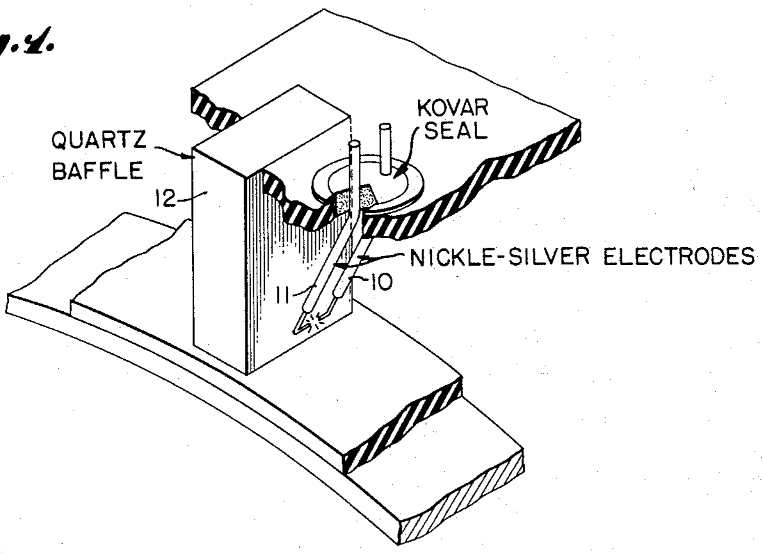
FIGURE 1 is a schematic perspective view showing the construction of an R.F. arc recording head.
Figure 2:
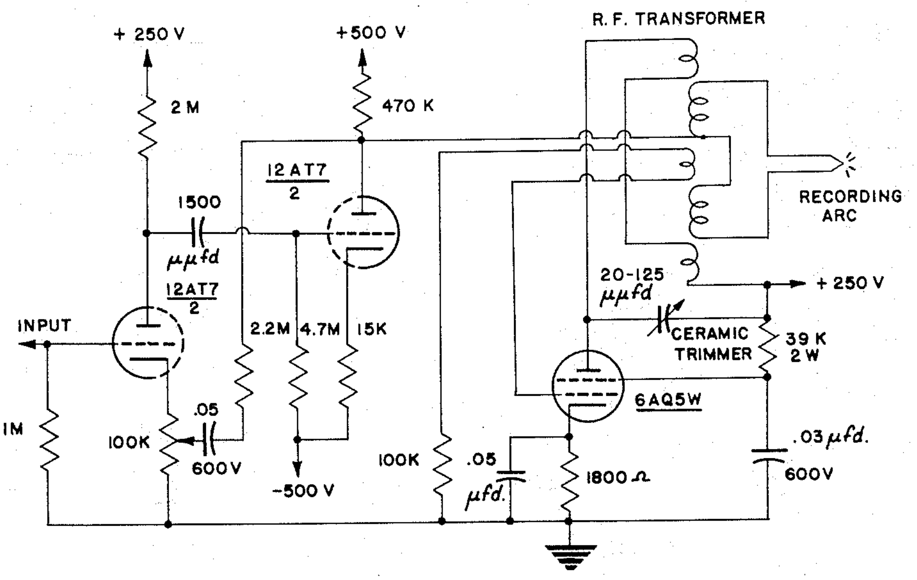
FIGURE 2 is a diagram showing a driving circuit for an R.F. arc recording head.

Satisfactory recording has been obtained with the R.F. arc recording head. The geometry of the head is shown in FIGURE 1, and the associated circuitry required to drive the arc is shown in FIGURE 2. An arc type discharge is maintained between the ends of the two electrodes 10 and 11 by a high impedance R.F. transformer having a balanced output winding and operating at a frequency of approximately 400 kc. The audio voltage to be recorded is fed to the center tap of the transformer secondary to vary the average potential of the arc.

A voltage of about 3 kv. R.M.S. is required to initiate the discharge, and once struck, the arc operates with a current of 1 to 3 ma. at a voltage of 300 to 600 volts R.M.S. The current regulation for the arc is obtained by adjusting the coupling of the R.F. transformer. When properly adjusted, the plate power drawn by the oscillator tube is the same before and after the arc has struck.

Figure 3:
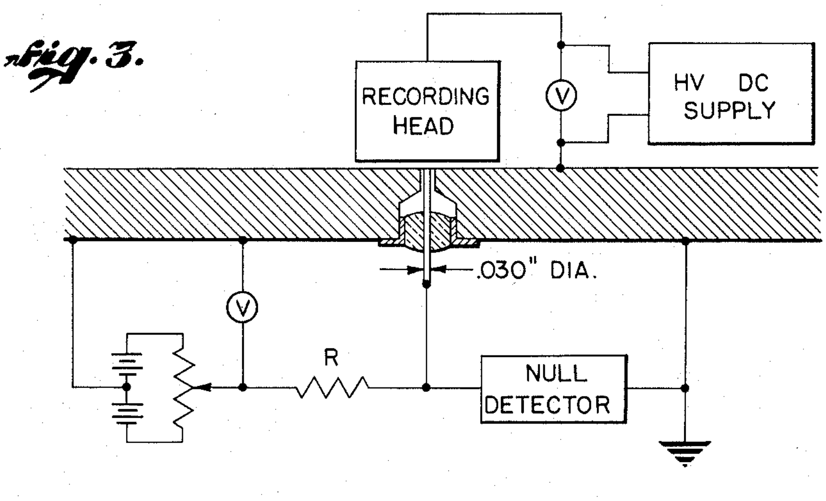
FIGURE 3 is a diagram showing an apparatus for measuring conduction characteristics of recording heads.
Figure 4:
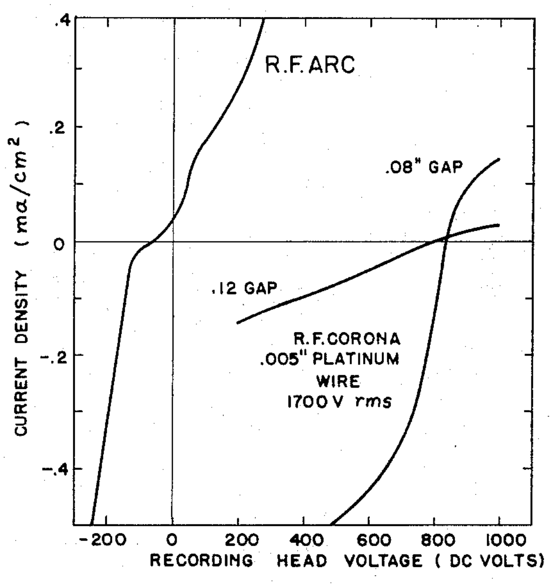
FIGURE 4 is a graph showing conduction characteristics of several recording heads as a function of D.C. recording head voltage.

An apparatus for measuring the conduction characteristics of the recording heads of my invention is shown in FIGURE 3. The conduction characteristic, i.e., the D.C. charging current vs. the D.C. driving voltage is obtained by centering the pickup probe in the conducting region and varying the D.C. potential applied to the recording head. The conductivity of the R.F. arc recording head is shown in FIGURE 4. The minimum slope corresponds to an equivalent resistivity of 2 megohms cm.$^2$.

Figure 5:
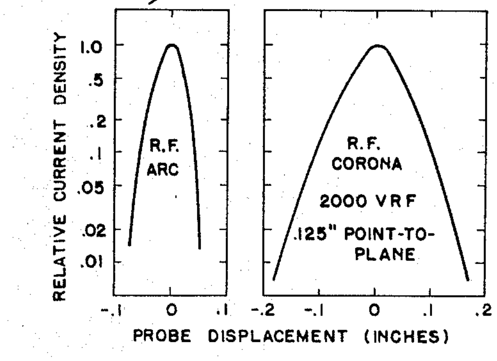
FIGURE 5 is a graph showing conduction characteristics of several recording heads as a function of linear displacement.

The boundaries of the conduction area are determined by applying an arbitrary D.C. potential to the head and then moving the probe with respect to the head in the same direction the recording medium will be moving. The results of these arrangements are shown in FIGURE 5. It can be seen that the conducting area, for the R.F. arc is very sharply defined. This definition is a result of the quartz baffle 12, FIGURE 1 which is effective in restricting the ionization to a highly localized region, thereby forming the trailing edge of the recording head.

The R.F. discharge is quite stable. Fluctuations of average potential amount to about 0.3 volt, R.M.S. with nickel-silver electrodes. This fluctuation is dependent on several factors; the impedance of the R.F. driving transformer, the electrode materials, electrode geometry, and air turbulence in the recording head. Although any suitable electrode materials may be used, nickel-silver wire has been found to be quite satisfactory. It gives a more stable discharge than platinum, although the wear seems to be greater. Tests show that a life of 500 to 1000 hours may be expected from nickel-silver electrodes.

Figure 6:
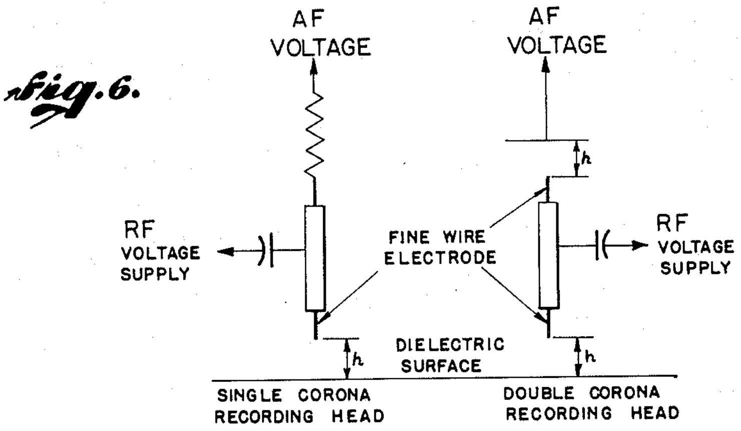
FIGURE 6 is a diagram schematically representing several R.F. corona recording heads showing the point-to-plane gap, *h*, and the method of coupling the audio and R.F. voltages to the heads.

A less expensive and more compact type of recording head utilizes a point-to-plane R.F. corona as an ionization source; the R.F. driving circuit is also simple—particularly when multiple channel recording is required. The corona may be used either single ended or balanced in a manner shown schematically in FIGURE 6. In either case a simple R.C. dividing network may be used to couple the R.F. and A.F. power to the corona electrode. The low power drain and positive resistance characteristic of the corona discharge makes it possible to operate many recording heads in parallel from the same R.F. supply, thereby greatly reducing the number of components in the recording circuit.

Figure 7:
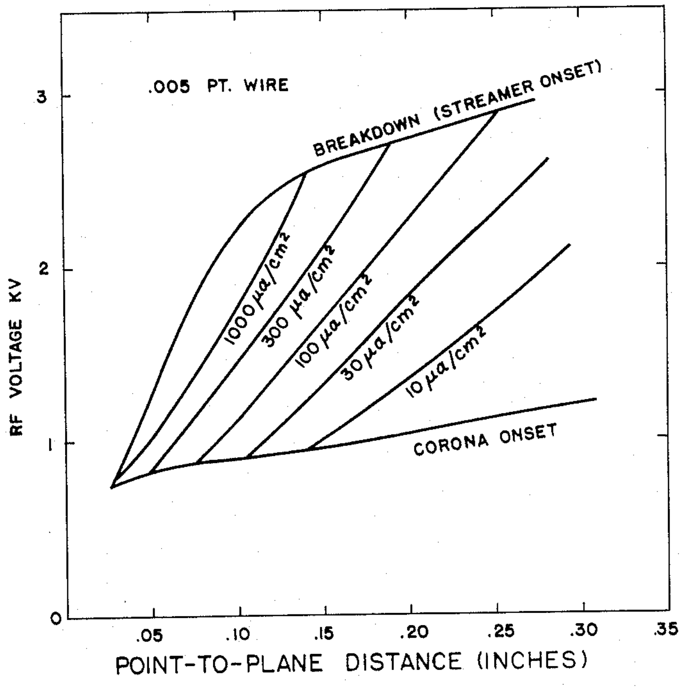
FIGURE 7 is a graph showing operating characteristics of a point-to-plane corona for a 0.005 inch diameter platinum wire point.
Figure 8:
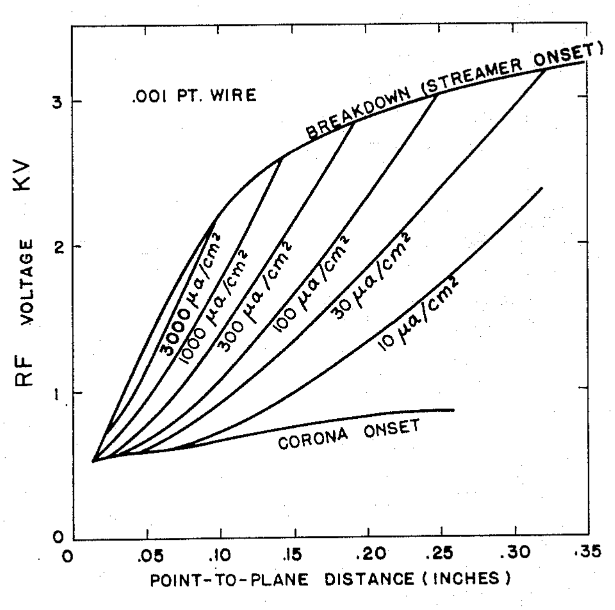
FIGURE 8 is a graph showing operating characteristics of a point-to-plane corona for a 0.001 inch diameter platinum wire.

The characteristics of an R.F. point-to-plane corona are plotted in FIGURES 7 and 8 for two sizes of platinum wire points. It can be seen that there is a minimum gap in each case below which a stable discharge cannot be maintained. For larger gaps there exists a region of stable operation with a lower limit, the minimum voltage required for corona onset, and upper limit, the streamer onset voltage. Within this stable region a variation of 100 to one in conduction current may be obtained by varying either the R.F. voltage or the point-to-plane gap. For large enough gaps, the corona will operate very stably over a variation of 2.5 to 1 in R.F. voltage, making careful regulation of the R.F. voltage unnecessary. The point size influences the corona onset voltage and the minimum gap.

The conduction characteristics of a single corona recording head for two values of point-to-plane gaps are compared with those of the R.F. arc in FIGURE 4. The conductivity was measured in the same manner as that used for the arc. The conductivity is considerably more unsymmetrical than that of the R.F. arc, both with respect to current and to voltage. Inasmuch as the change of slope in the curve does not occur at zero current, the properties of the head for recording are not seriously impaired by this asymmetry. However, due to the large value of the voltage at zero current intercept, fluctuations in the corona give rise to a fluctuation of the average potential of about 3 volts R.M.S., which is 10 times that generated by the arc.

The distribution of current density over the corona recording head was measured by the same method used for the arc. A typical curve is compared with one for the arc in FIGURE 5. It is immediately evident that the arc is superior as far as the sharpness of the boundary is concerned. However, the greater effective width of the corona head means that for the same conductivity, better erasure will be obtained with the corona head than with the arc. It should be pointed out that while a quartz baffle 12, FIGURE 1, is used to obtain the sharp boundary for the arc, no baffling is necessary to define the boundary of the corona. A baffle on the leading edge of the recording head to reduce the wind associated with the surface motion of the drum is beneficial in both the R.F. arc and the corona head in reducing flutter in the discharge, and hence the recording noise level.

Figure 9:
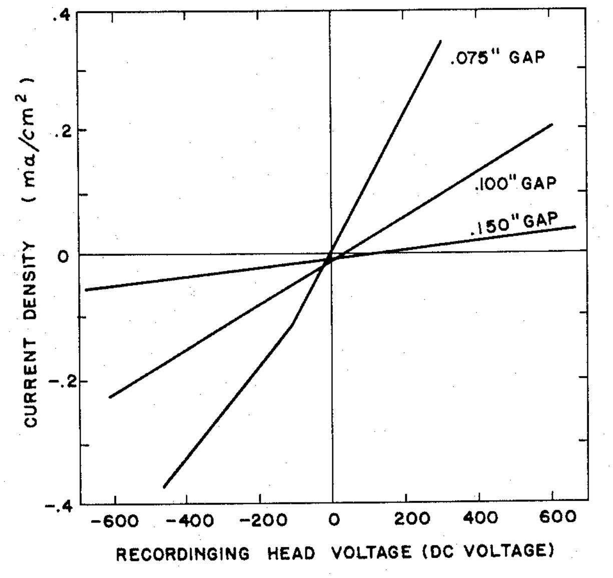
FIGURE 9 is a graph showing conduction characteristics of a double corona recording head as a function of recording head voltage for several point-to-plane gaps.

The double corona recording head is more compact than the single ended head in that the second corona takes the place of the A.F. coupling resistor. Also, the average potential of the dielectric is near ground potential rather than the 600 to 800 volts as occurs with the single corona head. An important result of placing the two coronas in series is the effect on the conduction characteristics of the head. The conduction curves for the double corona shown in FIGURE 9 show a very linear characteristic in contrast to the conduction curve of FIGURE 4 for the single corona. The conductivity may be controlled over wide limits by varying the gap and/or the R.F. driving voltage. The disadvantage of the double corona is that the recording noise is doubled since both coronas generate random noise independent of each other, and the noise on the drum is the R.M.S. sum of the two.

The properties of a particular recorder which has been constructed are typical and serve as a guide for specialized recorder design. A 3½" diameter aluminum alloy cylinder covered by a 1/32" Lucite sleeve was used as the storage drum. Stupakoff metal-glass ceals having an effective conductor radius of 0.036" were used as pickup probes. Both R.F. arc and corona recording heads are mounted around the drum to compare their recording characteristics.

Figure 10:
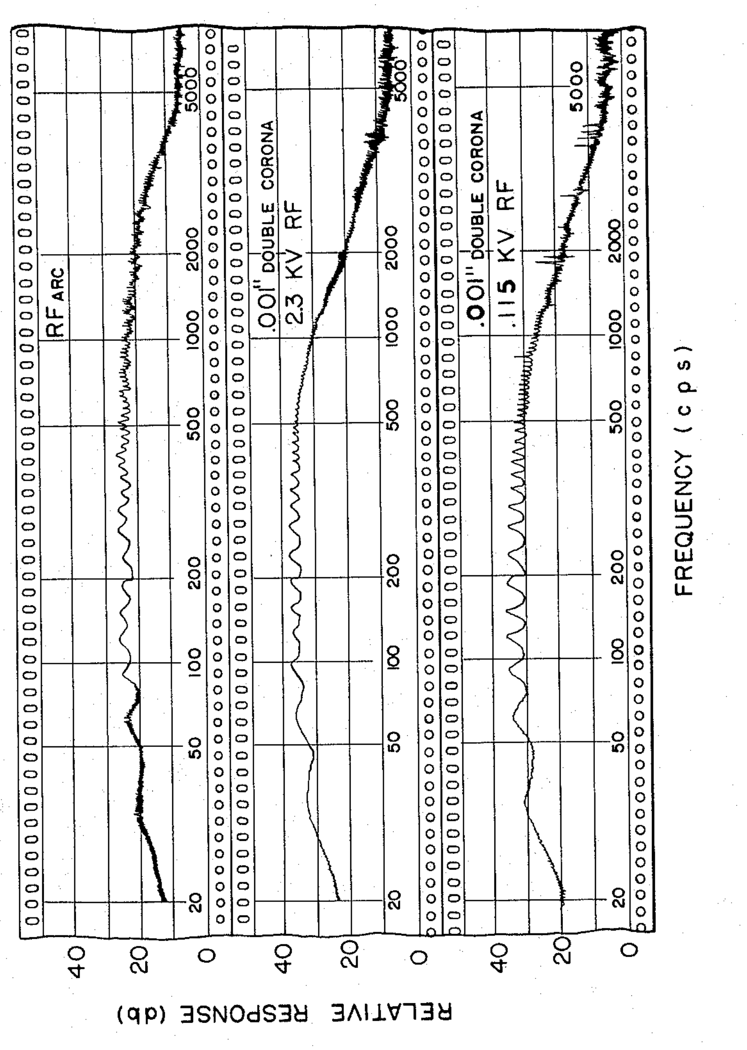
FIGURE 10 is a graph showing frequency response of several recorders using an R.F. arc recording head, and a double corona recording head, with two values of R.F. driving voltage.

The frequency response of the R.F. recording head is compared with that of a double corona recording head in FIGURE 10. A surface speed of 330 inches per second was used for all three curves. The low frequency cutoff in each case is determined by the low frequency response of the pickup probe cathode follower. The high frequency limit is approximately that of the theoretical response of the circular pickup probe in the case of the R.F. arc, whereas the high frequency cutoff for the double corona head is considerably lower. It is apparent that the larger effective width of the recording head as was shown in FIGURE 5 is the limiting factor in the latter use.

The frequency response curves of FIGURE 10 also show an interference on the drum due to incomplete erasure. The amplitude of this interference pattern is determined by the conductivity of the head, the surface speed, and the thickness of the dielectric layer on the drum. When the recorder was driven at a surface speed of 30 inches per second this interference was negligible. The effect of R.F. voltage on the conductivity of a double corona head may be seen by comparing the amplitudes of the interference patterns of the two lower curves of FIGURE 10 where the same head is driven with two different R.F. voltages.

By reducing the conductivity of the head, the amplitude of the interference pattern may be increased arbitrarily, so that the surface charge pattern results from the superposition of charge over many drum revolutions. When operated in this manner, the dielectric recorder serves as a multiple sweep integrator or comb filter, selecting input signals which are periodic or synchronized with the recording drum rotation period, and rejecting against input voltage variations which are not synchronized with the drum rotation period.

Figure 11:
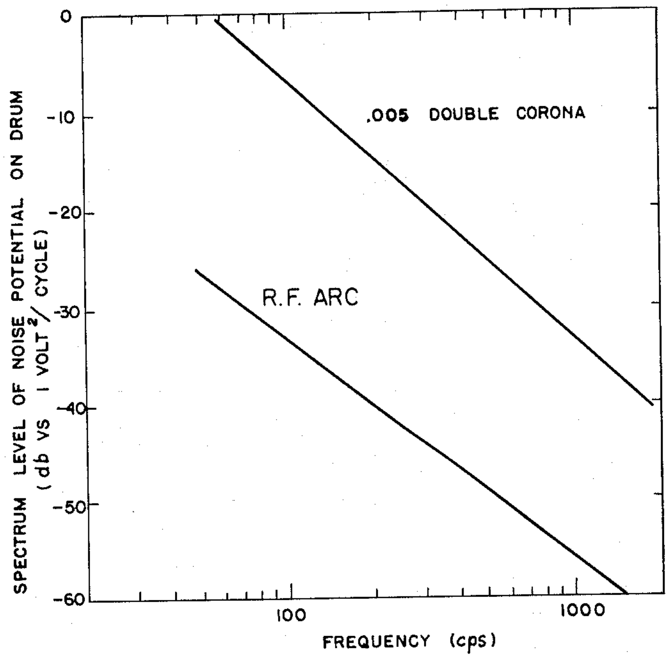
FIGURE 11 is a graph showing spectrum level of noise potential on the drum of a dielectric recorder for both an R.F. arc and a double corona recording head.

The dynamic range of the recorder is limited at low levels by the noise potential on the drum. The spectrum of the noise obtained with an R.F. arc is compared to that of a double corona head in FIGURE 11. There is a marked frequency dependence of this recorder noise indicating that the major contribution to the overall noise level will be from the lower frequencies. The very low noise level at the high frequency end permits the use of considerable equalization to extend the upper frequency cutoff of the recorder, while at the same time maintaining a good dynamic range. The difference between the two spectra is a measure of the relative stability of the R.F. arc with respect to the corona discharge. For a 40 c.p.s. low frequency cutoff, the total noise voltage for the R.F. arc is −10 db vs. 1 v., and the noise voltage for the double corona hed is +10 db. vs. 1 v.

The maximum recording level is determined by electrical breakdown on the surface. Using a recording level of 1500 v. R.M.S., the maximum dynamic range of the R.F. arc is 73 db and that of the double corona 20 db lower, or 53 db.

It will be seen that the dielectric recorder offers a simple record-playback technique for use where permanent storage is not required. However, storage times from one to one-hundred hours are attainable with commercially available plastics. A usable frequency response of one cycle to 5 kc. has been obtained, with a dynamic range greater than 50 db. This technique is especially advantageous for multichannel signal processing equipment in view of the low cost of pickup and recording heads, their compact size, and the overall simplicity of construction of such a recorder.

Figure 12:
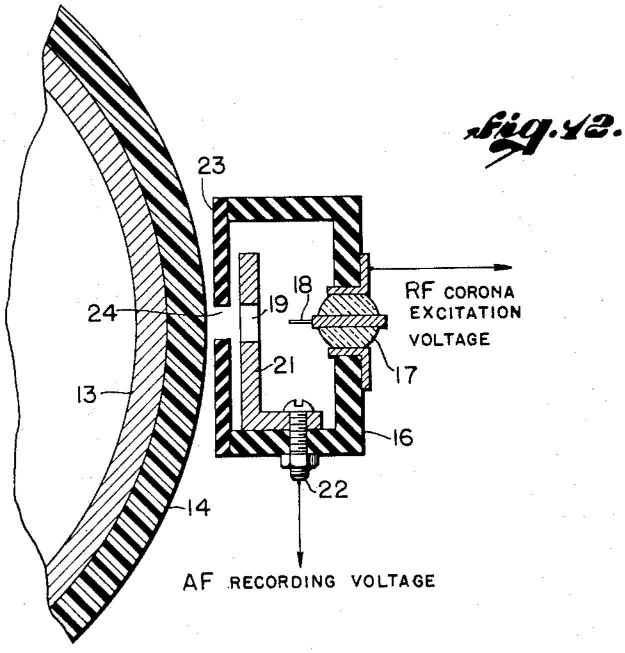
FIGURE 12 is a diagrammatic cross-sectional view showing the construction of an improved dielectric recording head.

The improved dielectric recorder of FIGURE 12 consists in a different type of coupling used to introduce the audio voltage which is to be recorded into the ionization discharge region. The recording drum 13 is shown at the left of FIGURE 12 covered by the dielectric coating shown at 14. An insulated housing 16 is used to support the components of the recording head.

In the operation of the head, an R.F. excitation voltage applied to the outer shell of the metal-to-glass seal 17 is coupled to the inner core of the seal by the shell-to-core capacity and serves to excite a corona discharge at the end of the (0.001″ to 0.005″ diameter) platinum wire electrode 18. This discharge causes the region in the vicinity of the recording drum to be ionized and thereby rendered conducting. The ionized air in the region 19 between the electrode 21, to which the audio voltage is applied at terminal 22, and the surface of the drum serves as a conducting path to transmit charge from the electrode 21 to the surface of the drum thereby performing the recording process.

A baffle 23 with the gap dimension 24 is used to define the region of conduction and so to determine the minimum wave length recorded on the drum. In some cases this baffle, which is shown as an insulating baffle, may be incorporated with the electrode 21 as either an insulated layer on the surface of the electrode 21, or with a choice of suitable corrosion-resistant materials, it may be the conducting face of the electrode 21 itself.

The effective conduction of the head may be controlled by several means. The R.F. voltage applied to the head has a marked effect on the conductivity of the ionized region, the spacing of the electrode 18 to the surface of the drum also influences the conductivity of the head, and the slit or baffle opening 24 also controls the conduction of the head. When the head is to be used for multiple sweep integration where very small conductivity (i.e., an effective high-impedance head), is desired, any one of these three methods of controlling the conductivity may be used, although the most desirable method appears to be the control of the slit opening 24.

The improvement of this type of coupling for the head, as compared to the heads described above, lies in the fact that the self-voltage of the corona discharge is effectively balanced out. In other words, the high potential drop of several hundred volts, which has been mentioned previously for the corona discharge, occurs not between the recording voltage and the surface of the drum, but between the discharge region and the platinum wire electrode 18 which is floating with respect to ground.

Thus, fluctuations in this voltage cause fluctuations in the effective D.C. potential of the electrode 18 while causing a very small variation in the potential difference between the recording electrode 21 and the surface of the drum. Since these fluctuations are the source of the background noise of the dielectric recorder, it is readily seen that any reduction in this fluctuation amplitude causes a corresponding reduction in the recorder noise characteristic. Thus, this type of a head corresponds favorably with the R.F. arc recording head without having the disadvantage of the high operating power and the short electrode life experienced with the R.F. arc recording head.

When using this head for high-frequency recording on an integrating drum, that is, using the high-impedance operation of the head, it is sometimes necessary to overcome the capacitive loading of the platinum wire electrode to the shell of the metal glass seal 17. This may be neutralized by superimposing the audio voltage to be recorded on the R.F. corona excitation frequency so that the outer shell of the metal glass seal used to couple the R.F. power to the corona discharge will be driven by the audio amplifier directly rather than having to be driven through the corona discharge which has a resistivity comparable to the reactance of the shell-to-core capacity of the metal-to-glass seal.

In developing the recording heads described above, it has been found that the surface resistivity is dependent on the relative humidity of the atmosphere surrounding the dielectric as well as the roughness and cleanliness of the surface. An effective method of greatly increasing the surface resistivity is to coat the drum with a thin layer of silicone oil. This layer of oil effectively eliminates the surface conduction, and does not impair the recording properties of the dielectric to any noticeable extent.

In addition to the storage properties of the dielectric materials, there are other properties to be considered when choosing the dielectric: The stability of the material, both chemical and physical should be considered. The intense ionization and consequent strongly oxidizing atmosphere generated by the recording heads may attack some plastics and radically change their properties, so a chemically inert material is desirable. The physical stability is also important since the drum should be machined to present a smooth homogeneous surface for the recording, and deformation of this surface through cold flow or crazing of a plastic is highly undesirable.

In the light of the above considerations, it has been convenient to use methyl methacrylate resin in the construction of dielectric recorders. With this resin, storage times in excess of one hour are obtained. If a longer storage is desired, the time constant can be increased two orders of magnitude with other plastics, such as, polytetrafluorethylene, polystyrene, and epoxy resin, for example.

It should be pointed out that, of all the common gases, air at atmospheric pressure has one of the highest ion recombination coefficients giving the shortest ion lifetimes and consequently sharpest boundaries of the conducting region. For this reason, and because of the simplification of design, the recording heads described above have been designed for operation in air at atmospheric pressure. It will be understood, however, that the recording heads of my invention can be operated in any other suitable gas, and at subatmospheric and superatmospheric pressures.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claims so as to embrace any and all equivalent structure.

Having described my invention, what I claim as new and desire to secure by Letters Patent is:

1. A recording apparatus for storing electrical signals as electrostatic surface charges comprising, a member of dielectric material having an exposed surface, a recording head comprising electrical discharge means adjacent said surface for ionizing the air adjacent said surface in a predetermined region, means for moving said surface of said dielectric member past said discharge means, a source of high frequency alternating voltage connected to said discharge means for producing an air-ionizing electrical discharge, and recording means for impressing a variable voltage differential between said recording head and said surface in said predetermined region whereby said variable voltage causes conduction through said ionized air and the production of variable electrostatic charges on the surface of said member.

2. Apparatus as defined in claim 1 wherein said electrical discharge means comprises a pair of electrodes spaced from each other and from said surface for producing a corona discharge.

3. Apparatus as defined in claim 1 wherein said electrical discharge means comprises electrodes spaced from each other and from said surface, said recording means comprising a further electrode adjacent but spaced from said discharge means.

4. Apparatus as defined in claim 1 including an insulating housing around said discharge means but having a relatively small opening adjacent said surface to define said predetermined region.

5. Apparatus as defined in claim 1 wherein said electrical discharge means comprises at least one electrode spaced from said surface, said recording means comprising means for applying said variable voltage to said electrode.

References Cited in the file of this patent

UNITED STATES PATENTS

| | | |
|---|---|---|
| 1,926,406 | Rieber | Sept. 12, 1933 |
| 2,143,214 | Selenyi | Jan. 10, 1939 |
| 2,197,050 | Kellogg | Apr. 16, 1940 |
| 2,872,529 | Hollmann | Feb. 3, 1959 |

FOREIGN PATENTS

| | | |
|---|---|---|
| 671,056 | Great Britain | Apr. 30, 1952 |